US010302923B2

(12) United States Patent
Chan

(10) Patent No.: US 10,302,923 B2
(45) Date of Patent: May 28, 2019

(54) TRANS-ILLUMINATION IMAGING WITH USE OF INTERFERENCE FRINGES TO ENHANCE CONTRAST AND FIND FOCUS

(71) Applicant: Molecular Devices, LLC, Sunnyvale, CA (US)

(72) Inventor: Matthew Chan, Palo Alto, CA (US)

(73) Assignee: Molecular Devices, LLC, San Jose, CA (US)

( * ) Notice: Subject to any disclaimer, the term of this patent is extended or adjusted under 35 U.S.C. 154(b) by 211 days.

(21) Appl. No.: 15/335,032

(22) Filed: Oct. 26, 2016

(65) Prior Publication Data

US 2018/0113290 A1     Apr. 26, 2018

(51) Int. Cl.
| | | |
|---|---|---|
| *H04N 7/18* | (2006.01) |
| *G02B 21/00* | (2006.01) |
| *G02B 7/36* | (2006.01) |
| *G02B 21/08* | (2006.01) |
| *G02B 21/24* | (2006.01) |
| *G02B 27/09* | (2006.01) |
| *G06K 9/00* | (2006.01) |
| *G06T 5/00* | (2006.01) |
| *H04N 5/225* | (2006.01) |
| *H04N 5/232* | (2006.01) |

(52) U.S. Cl.
CPC ......... *G02B 21/0056* (2013.01); *G02B 7/365* (2013.01); *G02B 21/086* (2013.01); *G02B 21/244* (2013.01); *G02B 27/0905* (2013.01); *G06K 9/00134* (2013.01); *G06T 5/008* (2013.01); *H04N 5/2256* (2013.01); *H04N 5/23212* (2013.01)

(58) Field of Classification Search
CPC .............. G02B 21/0056; G02B 21/086; G02B 21/244; G02B 27/0905; G02B 7/365; G06K 9/00134; G06T 5/008; H04N 5/2256; H04N 5/23212
USPC ........................................................ 348/79
See application file for complete search history.

(56) References Cited

U.S. PATENT DOCUMENTS

| | | | | |
|---|---|---|---|---|
| 2014/0340651 | A1* | 11/2014 | Kurashige | G02B 5/32 353/38 |
| 2015/0054921 | A1* | 2/2015 | Dixon | G02B 21/26 348/46 |
| 2015/0241202 | A1* | 8/2015 | Jiang | G01B 9/02091 356/479 |

OTHER PUBLICATIONS

Ali, Rehan, et al., Phase-Based Segmentation of Cells From Brightfield Microscopy, IEEE, I-4244-0672-2/07, 2007, pp. 57-60.

(Continued)

*Primary Examiner* — Allen C Wong

(57) ABSTRACT

System of, and method for, trans-illumination imaging with use of interference fringes to enhance contrast and/or find focus. In an exemplary method, a coherence of light may be reduced upstream of a sample by scattering and mixing at least a portion of the light. The sample may be irradiated with the light of reduced coherence. An image of the sample may be detected, with the image being created with at least a portion of the light of reduced coherence that has passed through a plane defined by the sample. Image detection may be performed with the sample sufficiently defocused to form interference fringes in the image. The step of reducing a coherence of light may attenuate the interference fringes.

23 Claims, 13 Drawing Sheets

(56) References Cited

OTHER PUBLICATIONS

Marrison, Joanne, et al., Ptychography—a label free, high-contrast imaging technique for live cells using quantitative phase information, Scientific Reports 3: 2369 DOI: 10.1038/srep02369, Aug. 6, 2013, pp. 1-7.

Mualla, Firas, et al, Automatic Cell Detection in Bright-Field Microscope Images Using SIFT, Random Forests, and Hierarchical Clustering, IEEE, 2013, pp. 1-14.

U.S. Appl. No. 14/886,998 (Nonpublished). Molecular Devices, LLC., filed Oct. 19, 2015.

\* cited by examiner

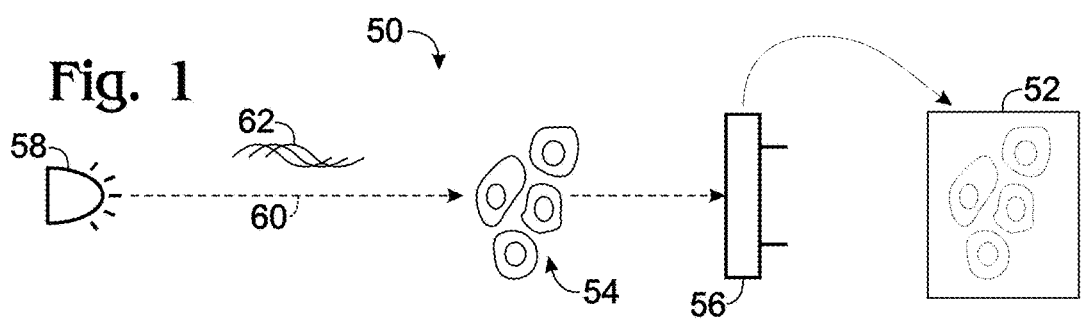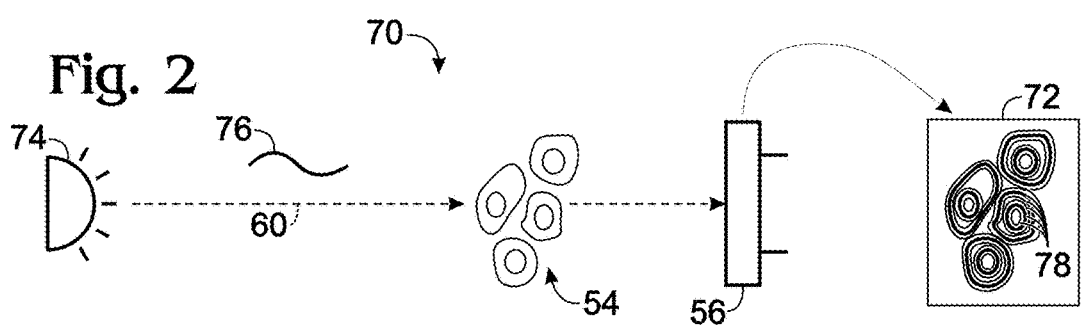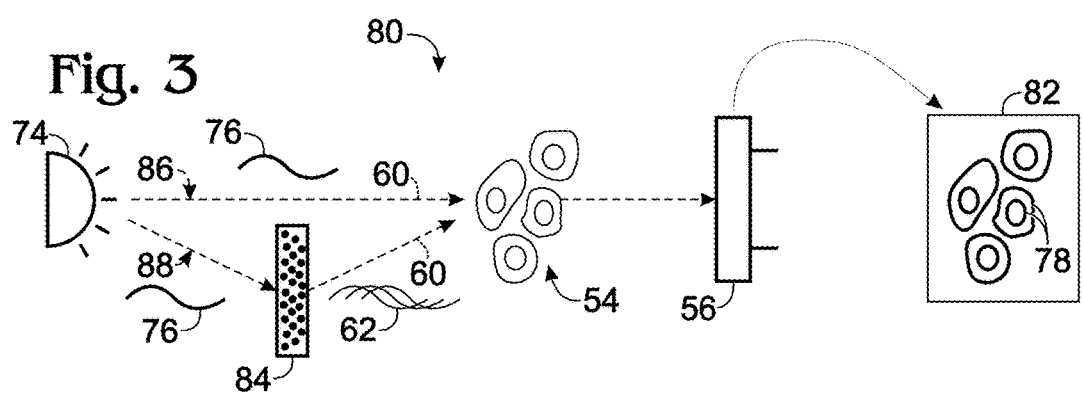

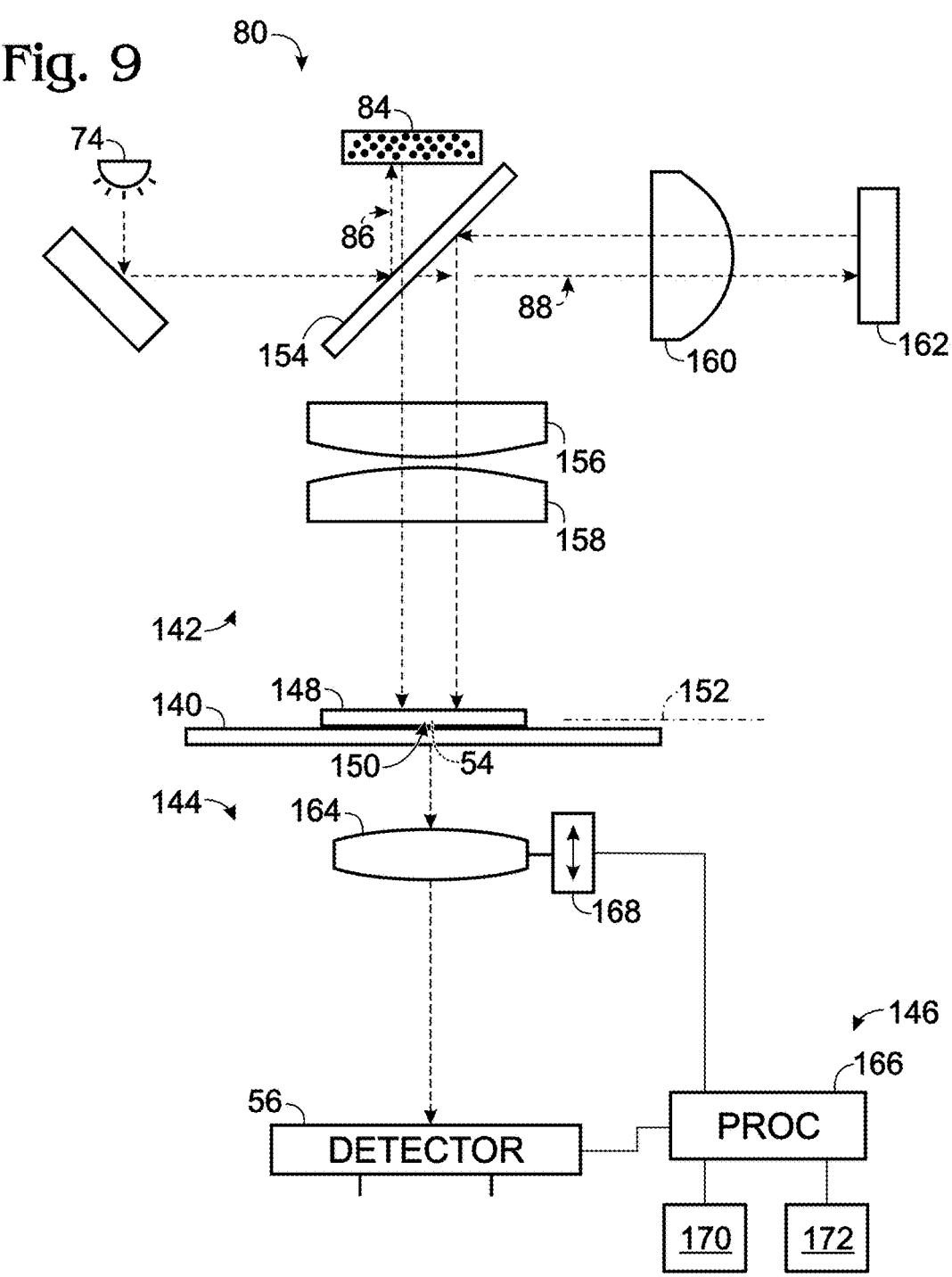

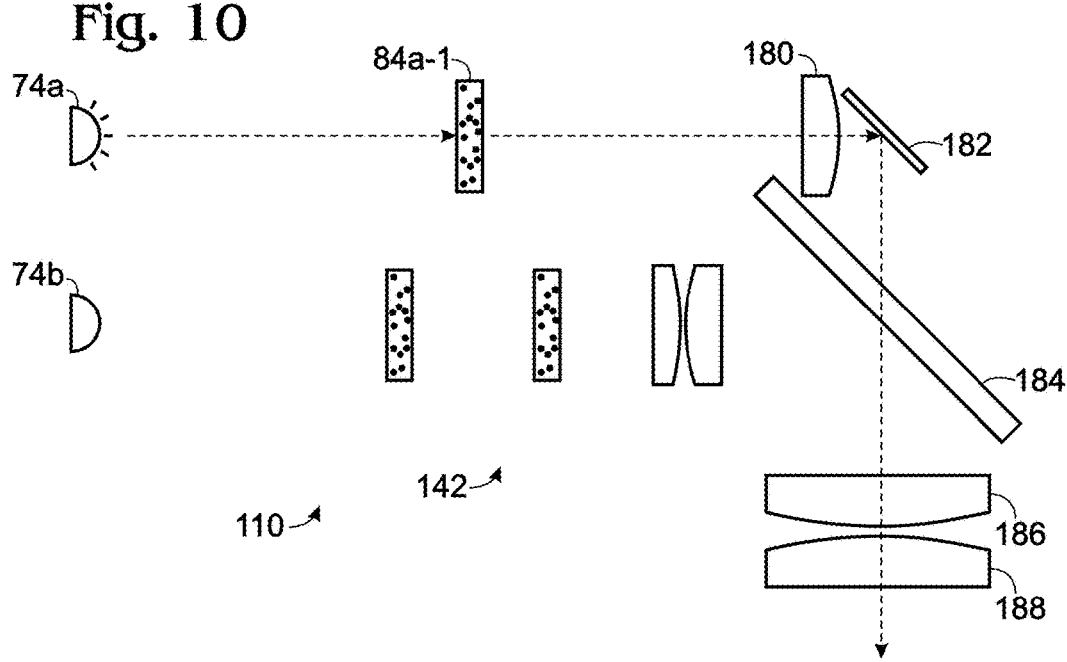
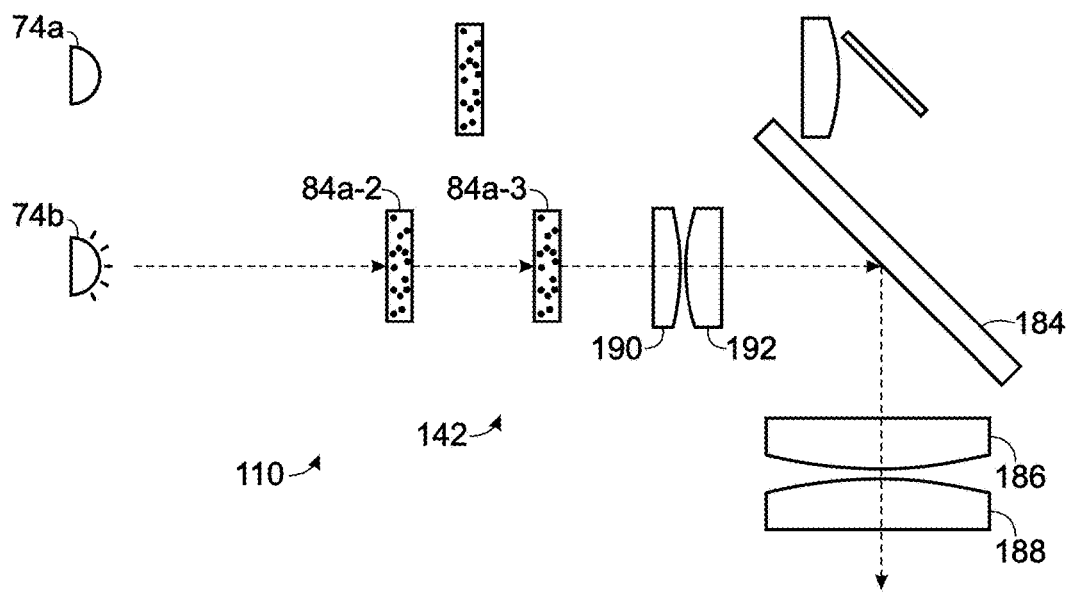

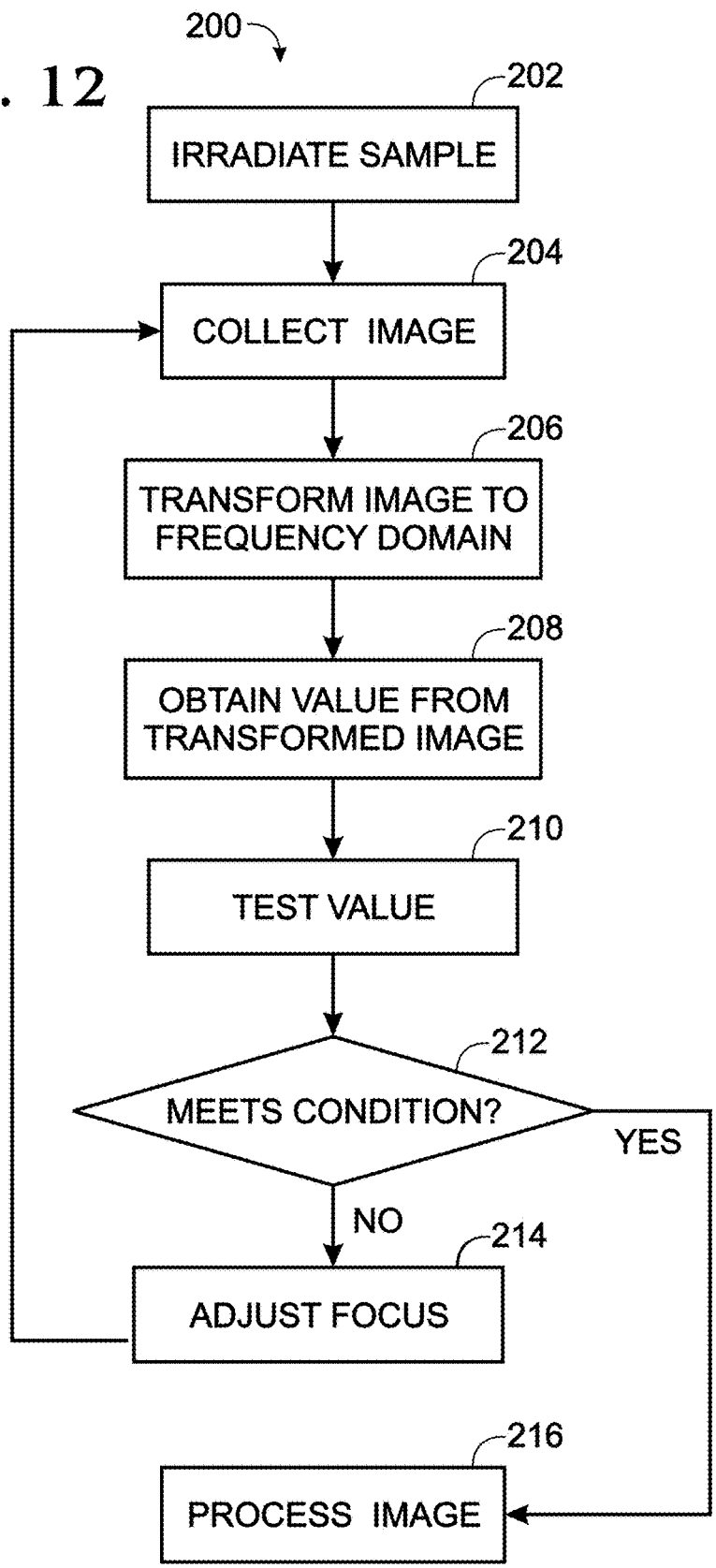

TRANS-ILLUMINATION IMAGING WITH USE OF INTERFERENCE FRINGES TO ENHANCE CONTRAST AND FIND FOCUS

INTRODUCTION

A layer of biological cells supported on a planar substrate can be visualized with an imaging microscope. The microscope may be designed to perform trans-illumination imaging in which light is transmitted through the cells to an imaging detector. The cells can be stained before they are imaged or left unstained.

Staining the cells can render them much easier to detect, resulting in better image quality. However, most stains require the cells to be fixed and thus killed, making these stains unsuitable when cell viability is important. Vital stains for living cells have been developed but possess limited utility; vital stains selectively stain only dead cells among the living, or modify cell physiology.

Imaging unstained, live cells is often preferred. The cells can be imaged directly, such that the state of the cells and the composition of their culture medium is affected minimally, if at all. However, when unstained, cells can be difficult to detect—the boundaries of the cells, and organelles therein, exhibit poor contrast with background, making the cells and features therein indistinct. Accordingly, processing images of the cells electronically may yield inaccurate values for cell parameters such as the number of cells present in an image. Optical techniques (e.g., phase contrast or differential interference contrast (Nomarski)) may be exploited by imaging microscopes to improve contrast, but these techniques substantially increase the cost and complexity of the optical design. Other approaches to imaging unstained cells are needed.

SUMMARY

The present disclosure provides a system of, and method for, trans-illumination imaging with use of interference fringes to enhance contrast and/or find focus. In an exemplary method, a coherence of light may be reduced upstream of a sample by scattering and mixing at least a portion of the light. The sample may be irradiated with the light of reduced coherence. An image of the sample may be detected, with the image being created with at least a portion of the light of reduced coherence that has passed through a plane defined by the sample. Image detection may be performed with the sample sufficiently defocused to form interference fringes in the image. The step of reducing a coherence of light may attenuate the interference fringes.

BRIEF DESCRIPTION OF THE DRAWINGS

FIG. 1 is a schematic view of a trans-illumination imaging system detecting a faint image of biological cells irradiated with incoherent light, with the focus of the cells at a local contrast maximum, and with no interference fringes visible.

FIG. 2 is a schematic view of another trans-illumination imaging system detecting an image of biological cells as in FIG. 1, except that the cells are irradiated with light that is at least partially coherent, with the focus of the cells at a local contrast maximum, and with an excessive number of interference fringes visible.

FIG. 3 is a schematic view of an exemplary trans-illumination imaging system detecting an image of biological cells as in FIGS. 1 and 2, except that the cells are irradiated with light having a level of coherence intermediate to FIGS. 1 and 2, with the focus of the cells at a local contrast maximum, and with the number of visible interference fringes intermediate to FIGS. 1 and 2, such that the quality of the image is improved, in accordance with aspects of the present disclosure.

FIG. 9 is a more detailed schematic view of an exemplary trans-illumination imaging system having the configuration of FIG. 3, in accordance with aspects of the present disclosure.

FIGS. 10 and 11 are more detailed schematic views of an exemplary illumination subsystem for the trans-illumination imaging system of FIG. 6, with optical paths for lower numerical-aperture irradiation (FIG. 10) and higher numerical-aperture irradiation (FIG. 11) indicated, in accordance with aspects of the present disclosure.

FIG. 12 is a flowchart listing exemplary steps of a method of focusing a trans-illumination imaging system, in accordance with aspects of the present disclosure.

DETAILED DESCRIPTION

Figure 4:
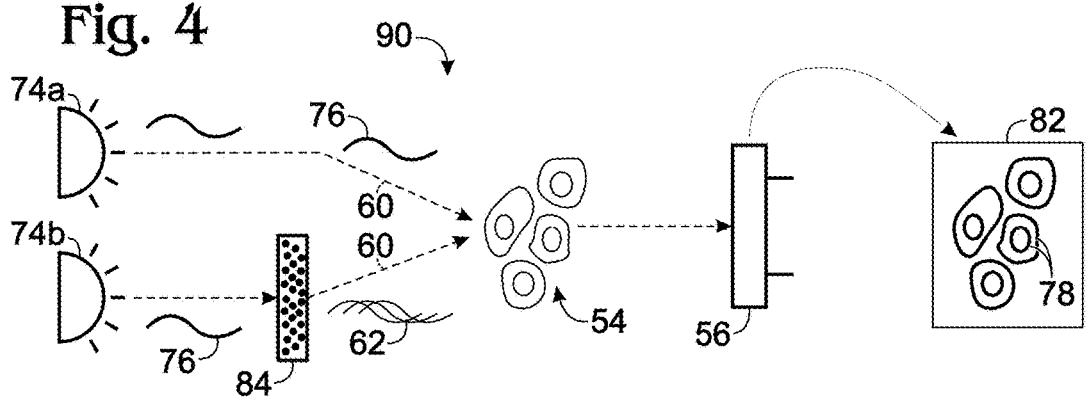
FIG. 4 is a schematic view of a trans-illumination imaging system detecting an improved image of biological cells as in FIG. 3, with the cells irradiated with light having a level of coherence intermediate to FIGS. 1 and 2 as in FIG. 3, except that the irradiation light is produced by two light sources, in accordance with aspects of the present disclosure.

The present disclosure provides a system of, and method for, trans-illumination imaging with use of interference fringes to enhance contrast and/or find focus. In an exemplary method, a coherence of light may be reduced upstream of a sample by scattering and mixing at least a portion of the light. The sample may be irradiated with the light of reduced coherence. An image of the sample may be detected, with the image being created with at least a portion of the light of reduced coherence that has passed through a plane defined by the sample. Image detection may be performed with the sample sufficiently defocused to form interference fringes in the image. The step of reducing a coherence of light may attenuate the interference fringes.

A system for trans-illumination imaging is provided. The system may comprise a light source to generate light that is at least partially coherent, and a stage to support a sample. The system also may comprise a diffuser, an objective, a focusing mechanism, an imaging detector, and a processor. The diffuser may be operatively disposed in an optical path between the light source and the stage, and may be configured to reduce a coherence of light incident on the sample by scattering and mixing light generated by the light source. The objective may be configured to collect light that has passed through a plane defined by the sample. The focusing mechanism may be configured to adjust a distance between the stage and the objective. The imaging detector may be configured to detect light received from the objective. The processor may be configured to cause the focusing mechanism to defocus the sample sufficiently such that interference fringes are formed in an image collected by the imaging detector. The diffuser also may be configured to diminish but not completely eliminate formation of the interference fringes.

A method of focusing an imaging system is provided. In the method, one or more images of a sample may be detected. The image may contain interference fringes and be detected with an imaging detector. Each of the one or more images may be transformed to a frequency domain. One or more values may be obtained from each transformed image. A focus of the sample on the imaging detector may be adjusted based on the one or more values from each transformed image. An image of the sample may be detected at the adjusted focus.

The systems and methods of the present disclosure offer various advantages over the prior art. The advantages may include any combination of the following: (a) sharper images of unstained, living cells, (b) more accurate measurement of cell parameters, (c) optical designs that are economical and robust, and/or (d) automated focusing based on fewer detected images, among others.

Further aspects of the present disclosure are described in the following sections: (I) trans-illumination imaging systems with attenuated interference fringes, (II) methods of trans-illumination imaging with attenuated interference fringes, (III) exemplary system configurations for trans-illumination imaging, (IV) methods of imaging with automated focusing using transformed images, and (V) examples.

I. Trans-illumination Imaging Systems with Attenuated Interference Fringes

This section provides an overview of exemplary trans-illumination imaging systems utilizing attenuated interference fringes to enhance contrast; see FIGS. 1-6. FIGS. 1 and 2 are presented for comparison with FIGS. 3-6, and do not utilize attenuated interference fringes.

FIG. 1 shows a trans-illumination imaging system 50 detecting an image 52 of a sample 54 (here, biological cells) with an imaging detector 56. The cells are irradiated with light generated by an incoherent light source 58. The light follows an optical path, indicated at 60, from light source 58, through the cells, to detector 56. Since the cells are irradiated with incoherent light, indicated schematically by offset, out-of-phase waveforms 62, there is no spatially differentiated interference of the light produced by interaction of with edges of the cells and/or organelles therein (e.g., nuclei). Accordingly, the cells have low contrast with background in image 52, and are difficult to identify reliably either by eye or through digital processing of the image.

FIG. 2 shows another trans-illumination imaging system 70 detecting an image 72 of sample 54 with imaging detector 56. In contrast to imaging system 50 of FIG. 1, the cells are irradiated with light generated by an at least partially coherent light source 74, indicated schematically by in-phase waveforms 76. Scattering, refraction, and/or diffraction of the light by the cells, and particularly exterior and interior features thereof (e.g., membranes), results in interference fringes 78 that increase the contrast of image 72 relative to image 52 of FIG. 1. However, the interference fringes include not only first order fringes closest to these features, but also second order, third order, fourth order, and even higher order fringes that are farther from the features and complicate interpretation of the image. The interference fringes may be created by constructive interference and/or destructive interference.

FIG. 3 shows an exemplary trans-illumination imaging system 80 detecting an image 82 in which interference fringes 78 are present but attenuated with respect to imaging system 70 of FIG. 2. The cells of sample 54 are irradiated with light of greater coherence than in FIG. 1 and lesser coherence than in FIG. 2, selectively eliminating higher order interference fringes, which are weaker than lower order fringes. As a result, image 82 is cleaner, and can be processed digitally to identify cells or features thereof more accurately.

Imaging system 80 creates light of intermediate coherence with a diffuser 84. A beam of light generated by partially coherent light source 74 is split upstream of the cells of sample 54. One portion of the split beam, indicated at 86, remains at least partially coherent. Another portion of the split beam, indicated at 88, interacts with diffuser 84 to reduce the coherence of the light. The portions of the split beam are recombined at or upstream of the cells.

FIG. 4 shows another exemplary trans-illumination imaging system 90 detecting an image 82 in which, as in imaging system 80 of FIG. 3, interference fringes 78 are present but attenuated with respect to imaging system 70 of FIG. 2. Rather than splitting a beam of light from a single, at least partially coherent light source 74 as in FIG. 3, imaging system 90 utilizes a pair of at least partially coherent light sources 74a, 74b. Light from light source 74a follows an optical path to the cells of sample 54 that bypasses diffuser 84, while light from light source 74b interacts with the diffuser. The two beams of difference coherence are combined at or upstream of the cells to create a beam of intermediate coherence.

Figure 5:
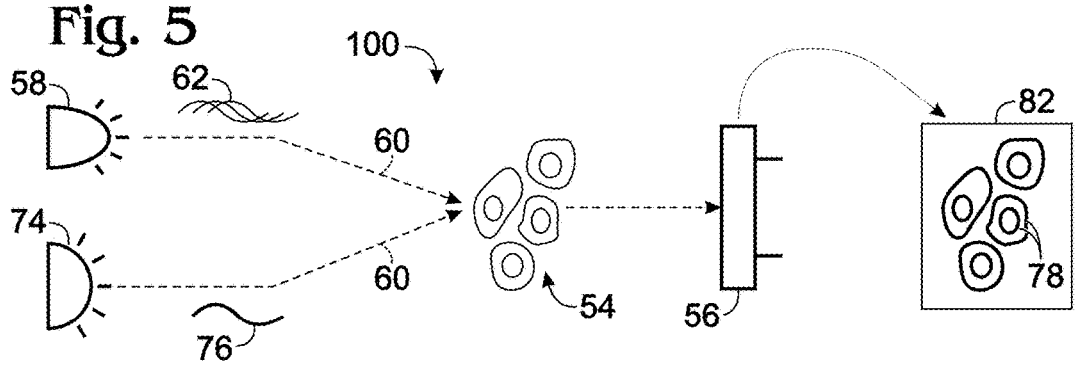
FIG. 5 is a schematic view of a trans-illumination imaging system detecting an improved image of biological cells as in FIG. 4, except that the two light sources generate light of different coherence, in accordance with aspects of the present disclosure.

FIG. 5 shows yet another exemplary trans-illumination imaging system 100 detecting an image 82 in which, as in imaging system 80 of FIG. 3, interference fringes 78 are present but attenuated with respect to imaging system 70 of FIG. 2. A light beam of intermediate coherence is produced by combining an incoherent beam generated by incoherent light source 58 with an at least partially coherent beam generated by light source 74.

Figure 6:
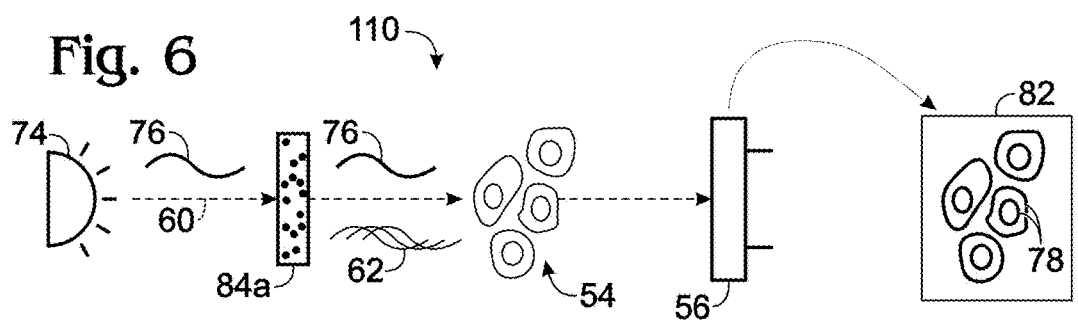
FIG. 6 is a schematic view of a trans-illumination imaging system detecting an improved image of biological cells as in FIG. 3, except that the irradiation light is not split into two beams upstream of the cells, in accordance with aspects of the present disclosure.

FIG. 6 shows still another exemplary trans-illumination imaging system 110 detecting an image 82 in which, as in imaging system 80 of FIG. 3, interference fringes 78 are present but attenuated with respect to imaging system 70 of FIG. 2. A partial diffuser 84a of reduced efficiency relative to diffuser 84 (e.g., see FIGS. 3 and 4) is located in an optical path between light source 74 and the cells of sample 54. Diffuser 84a reduces but does not completely eliminate the coherence of the light that irradiates the cells.

II. Methods of Trans-illumination Imaging with Attenuated Interference Fringes

Figure 7:
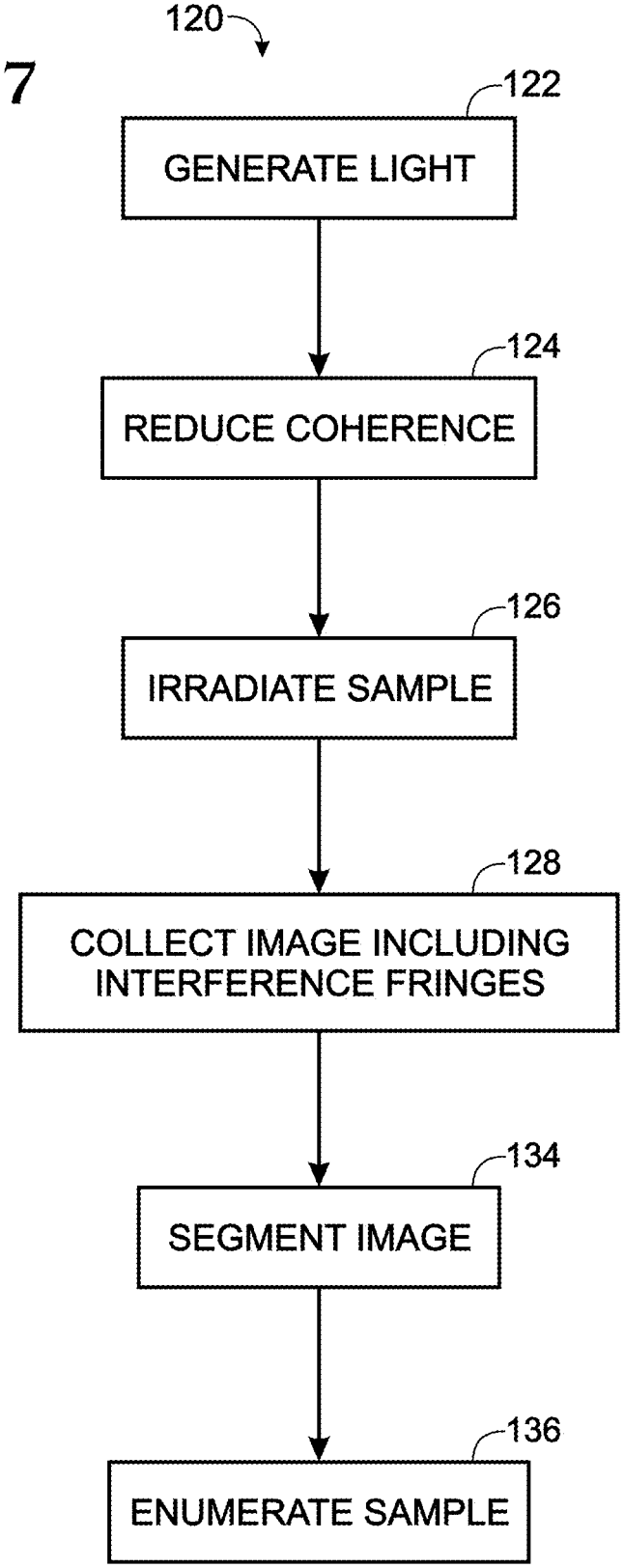
FIG. 7 is a flowchart listing exemplary steps of a method of trans-illumination imaging, in accordance with aspects of the present disclosure.
Figure 8:
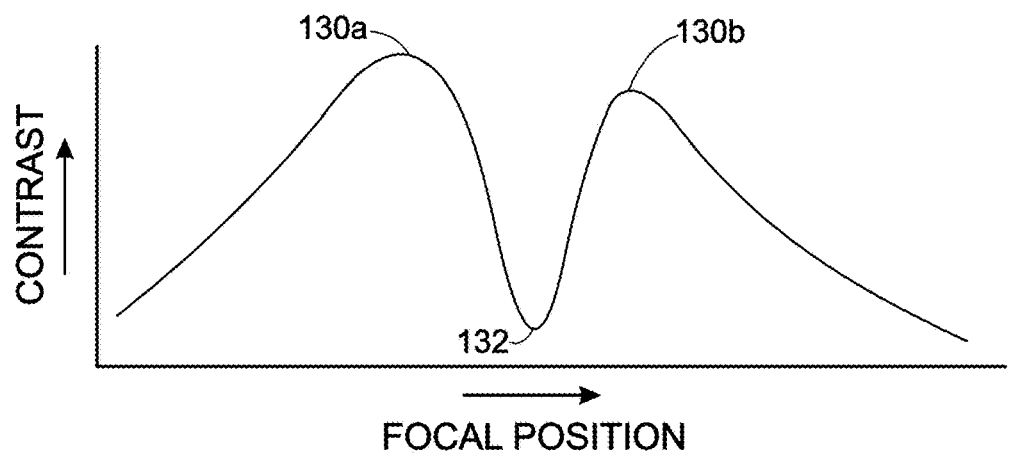
FIG. 8 is a graph illustrating an exemplary relationship between a focus metric (namely, contrast) and focal position for the trans-illumination imaging systems of the present disclosure.

This section describes methods of trans-illumination imaging utilizing attenuated interference fringes to enhance contrast with lower order fringes while selectively reducing the visibility of higher order fringes; see FIGS. 7 and 8.

FIG. 7 shows a flowchart of an exemplary imaging method 120. The steps presented FIG. 7 and/or described elsewhere herein may be performed in any suitable order and combination, using any of the system components and features of the present disclosure.

Light may be generated, indicated at 122. The light may be generated using one or more light sources. Each light source may generate light by any suitable mechanism, including electroluminescence, stimulated emission, thermal radiation, and/or photoluminescence, among others. Accordingly, the light source may include a solid-state device, laser, arc lamp, or the like. Exemplary solid-state devices include semiconductor light sources, such as light-emitting diodes (LEDs), superluminescent diodes, and laser diodes, among others. The light generated by a light source may be at least partially coherent, temporally and spatially. The light may have a coherence length of at least about 5, 10, 25, 50, or 100 μm, among others.

A spatial and/or temporal coherence of at least a portion of the light generated may be reduced, indicated at 124. The coherence may be reduced with at least one diffuser, which is any optical element that scatters and mixes light. Each diffuser may, for example, be a reflective diffuser that reflects light, a transmissive diffuser through which light passes, or the like. Exemplary diffusers include sandblasted/ ground glass diffusers, holographic diffusers, opal glass diffusers, or the like. The diffuser may render light completely incoherent or may reduce but not completely eliminate the coherence of light.

Each diffuser may be located at any suitable position in an optical path from a light source to the sample. The diffuser may be located on the only optical path from the light source to the sample, or on only one of two or more such optical paths. Accordingly, the diffuser may interact with light generated by only a subset of two or more light sources, or may interact with only one branch of a split beam, among others.

A coherence of at least a portion of the light also may be increased by spectrally filtering the light, such as with a bandpass filter. The light may be filtered upstream and/or downstream of a diffuser, or in an optical path that does not contain a diffuser (e.g., if a light beam is split or two light sources of different coherence are used).

A sample may be irradiated with light of reduced coherence, indicated at 126. The sample may include any suitable assembly, material, substance, isolate, extract, particles, or the like. For example, the sample may include biological cells to be imaged. The biological cells may be eukaryotic or prokaryotic, and may be alive or dead (e.g., fixed). Exemplary biological cells include established cells (cell lines), primary cells, cells of a tissue sample, cells from a clinical sample (e.g., a blood sample, a fluid aspirate, a tissue section, etc.), bacterial cells, or the like.

The sample may be held by a sample holder, which is any device for holding at least one sample or any array of spatially isolated samples. The sample holder may provide a substrate having at least one horizontal, upwardly-facing surface region on which biological cells of a sample may rest and/or be attached. The sample holder may have only one surface region for cell attachment, or multiple surface regions or compartments separated from one another. Each surface region may include a coating to encourage cell/tissue attachment. The coating may, for example, be poly-lysine, collagen, or the like. The coating may be located on a body of the sample holder, which may be formed of transparent plastic or glass, among others. Exemplary sample holders include slides, culture dishes, multi-well plates (e.g., having 4, 6, 8, 12, 24, 32, 48, or 96 wells, among others), or the like.

An image including attenuated interference fringes may be detected, indicated at 128. (Image "detection" and image "collection" are used interchangeably in the present disclosure.) The interference fringes may be attenuated by reducing the coherence of light upstream of the sample with a diffuser, by combining light beams of difference coherence, or a combination thereof, among others. In some embodiments, interference fringes of higher order may not yet be attenuated selectively when the image is collected, but may be attenuated through processing of the image after collection, as described further below.

The image may be detected with an imaging detector, which is any device capable of detecting spatial variations (e.g., variations in intensity) of light across a detection area. The imaging detector may be an array detector, such as a charge-coupled device (CCD) sensor, an active pixel sensor (e.g., a complementary metal-oxide-semiconductor (CMOS) sensor, an N-type metal-oxide-semiconductor (NMOS) sensor, etc.), or the like. The imaging detector may be configured to detect color images, grayscale (monochromatic) images, or both.

The image may be collected with the sample sufficiently defocused to produce interference fringes. The sample is defocused when the focal position (e.g., the position (i.e., the separation distance) of the sample and an objective relative to one another along the optical axis) is offset from a local contrast minimum, such as being at a local contrast maximum, closer to a local contrast maximum than a local contrast minimum, and/or intermediate a local contrast maximum and a local contrast minimum. These inflection points are illustrated by FIG. 8.

FIG. 8 shows a graph plotting a focus metric, contrast, as a function of focal position for trans-illumination images collected with an imaging system that irradiates a sample with at least partially coherent light. The contrast of the images detected for the same sample and field of view varies with focal position. More specifically, the contrast may have at least one local maximum, such as local contrast maxima 130a, 130b, and a local contrast minimum 132 located between the contrast maxima. The variation in contrast measured at different focal positions may be produced by changes in the spacing and intensity of interference fringes. The detectability of the fringes drops locally to a low point at the local contrast minimum and increases in both focal directions from the local contrast minimum, until reaching maxima 130a, 130b. The detectability then progressively decreases as the focal position differs even more from the local contrast minimum. The distance between the local contrast minimum and each contrast maximum is generally defined by the numerical aperture of the system's objective. Accordingly, once at least one of these distances has been determined (e.g., empirically or by calculation only) for a given objective of the system, the focal position of a contrast maximum for a sample and field of view can be calculated based on a measured focal position of the local contrast minimum for that sample and field of view.

One or more images of the sample may be collected automatically at one or more focal positions. Collection of these images may be performed before image detection step 128, or collection of the images may perform image detection step 128 by obtaining an image of sufficient quality/contrast for use in one or more subsequent steps of method 120. More particularly, the one or more images may be processed to choose an image of highest contrast for use in subsequent steps of method 120, if any of the images exceed a contrast threshold and/or was detected at less than a threshold offset from a local contrast maximum. (The focal position of a local contrast maximum, and thus the offset of each image's focal position from that maximum, may be determined using the one or more images.) Alternatively, or in addition, the one or more images may be processed to determine a focal position to which the imaging system should be adjusted automatically for subsequent performance of image detection step 128.

The one or more images may be a set of images collected at a series of different focal positions of the imaging system. The focal positions may be defined by the distance from the objective to the sample and may, for example, be varied by moving the objective while the sample remains stationary, moving the sample while the objective remains stationary, or moving both the sample and the objective differentially. The focal positions may cover a range that spans at least one local contrast maximum and/or a local contrast minimum. Values of a focus metric, such as contrast, may be obtained from the images. With a properly configured imaging detector, changing the focal position focuses (and defocuses) the sample. The different focal positions may be uniformly spaced from one another.

In other cases, a suitable focal position for image detection step 128 may be determined based on one or more collected images that have been transformed from a spatial domain to a frequency domain. Further aspects of this approach to find a suitable focal position (and thus focus) are described elsewhere herein, such as below in Section IV and in Example 2 of Section V.

Returning to method 120 in FIG. 7, the image detected at step 128 may be processed digitally. High frequency spatial information, such as higher order fringes, may be selectively eliminated from the image, to simplify the image and facilitate further processing. This elimination may be performed, for example, with a rolling ball algorithm, after Fourier transformation of the image, and/or the like. In some embodiments, the image may be transformed from a spatial domain to a frequency domain, filtered according to frequency, and then transformed back to the spatial domain.

The image may be segmented, indicated at 134, optionally after digital processing to selectively eliminate high frequency fringes. Segmentation may be any partitioning of the image into a plurality of segments (sets of pixels). At least a subset of the segments may correspond to individual cells, groups of cells, cellular organelles (e.g., the nucleus), or the like.

An aspect of the sample may be enumerated using the segmented image, indicated at 136, to provide a value for the aspect. The aspect may, for example, be a number of cells, organelles, cells having a given characteristic, or the like.

III. Exemplary System Configurations for Trans-illumination Imaging

This section describes further exemplary aspects of the trans-illumination imaging systems of Section I; see FIGS. 9-11. Any of the components and aspects described in this section may be included in any of the systems of Section I or described elsewhere herein, and may be utilized in the performance of any of the methods described herein.

FIG. 9 shows an exemplary, more detailed configuration of trans-illumination imaging system 80 of FIG. 3. Imaging system 80 may include a stage 140, an illumination subsystem 142, a detection subsystem 144, and a control/processing subsystem 146, among others. Subsystems 142, 144, 146 function cooperatively to enable trans-illumination imaging of sample 54.

Stage 140 is configured to support a sample holder 148, which, in turn, contains or otherwise holds one or more samples 54. The samples may be supported by stage 140 and sample holder 148 in an examination region 150 of a sample plane 152 (also called a specimen plane), which may be parallel to and optionally close to an xy plane (a horizontal plane) defined by the system (e.g., by the stage). The stage may define an optically transparent region (e.g., an opening) directly under examination region 150, to allow illumination and detection of samples using illumination and detection subsystems 142, 144 located on opposite sides of sample plane 152. In other embodiments, detection subsystem 144 may be located above sample plane 152, and illumination subsystem 142 below the sample plane.

Exemplary optical paths followed by optical radiation traveling respectively to sample 54 from light source 74, and from sample 54 to imaging detector 56, are represented with dashed arrows. The terms "optical radiation" and "light" are used interchangeably herein, and may include visible radiation, ultraviolet radiation, infrared radiation, or any combination thereof.

Illumination subsystem 142 may include only one light source 74 or may include a source assembly including a plurality of light sources to irradiate sample 54 (with the optional assistance of operatively associated optics). The terms "irradiate" and "illuminate" and corresponding forms thereof have the same meaning and are used interchangeably in the present disclosure. In some embodiments, two or more light sources may irradiate the sample in the examination region at the same time, and with light of different coherence (also see FIGS. 4 and 5). The two or more light sources may generate light of different coherence and/or the coherence of light from at least one of the light sources may be modified by one or more optical elements located upstream of the sample. Alternatively, or in addition, the two or more light sources may irradiate the sample with light that is spectrally different. The two or more light sources may generate light have different spectra and/or the spectrum of light from at least one of the light sources may be modified upstream of the sample with a spectral filter.

Illumination subsystem 142 may include one or more optical elements disposed in an optical path between light source 74 and examination region 150. An optical element may be any device or structure that collects, directs, and/or focuses light and/or at least partially blocks light. An optical element may function by any suitable mechanism, such as reflection, refraction, scattering, diffraction, absorption, and/or filtering, among others. Exemplary optical elements include lenses, mirrors, diffusers, gratings, prisms, filters, apertures, masks, beamsplitters, transmissive fibers (fiber optics), and the like.

The illumination subsystem 142 may split optical radiation from light source 74 with a beamsplitter 154 into a pair of portions or beams 86, 88. Beam 86 is reflected to a reflective diffuser 84, which scatters and mixes light of beam 86 to reduce its spatial and temporal coherence. Diffuser 84 reflects at least a portion of beam 86 to beamsplitter 154, through which part of the beam passes upstream of lenses 156, 158. Beam 86 passes through the lenses upstream of sample 54 on an optical path to the sample. In contrast to beam 86, beam 88 passes through beamsplitter 154 and a lens 160, and is reflected back to the beamsplitter by a mirror 162. Part of beam 88 is reflected by beamsplitter 154 to lenses 156, 158, thus combining light of beam 86 (with reduced coherence) with light of beam 88, to create a combined beam of intermediate coherence that irradiates sample 54.

Detection subsystem 144 includes imaging detector 56 and an objective 164, with the objective disposed in an optical path from examination region 150 to the detector. Objective 164 may include any optical element or combination of optical elements that gathers light from the sample and focuses the light to produce an image to be detected, and any associated support structure(s). The objective can, for example, include a single lens, two or more lenses, a single mirror, two or more mirrors, and/or the like. Objective 164 may provide any suitable magnification, such as at least 4×, 10×, 20×, 50×, or 100×, among others.

Control/processing subsystem 146 may be in communication with and/or may control operation of any suitable combination of devices of system 80, such as light source(s) 74 and imaging detector 56. Subsystem 146 may include a processor 166, which may receive and process image data from imaging detector 56, and may control operation of the imaging detector, such as the timing of image detection. Processor 166 further may control a focusing mechanism 168, which changes the focus of the system by moving objective 164 and stage 140 relative to one another (e.g., along the z-axis) to change the distance between the objective and the stage. The processor also may control a stage drive mechanism that moves the stage in two dimensions parallel to specimen plane 152. Control of one or both of these mechanisms may allow the system to automate sample focusing, imaging of multiple samples, and/or imaging multiple fields of view of the same sample.

Processor 166 may be provided by a computer. The computer may include a display 170, a user interface 172, memory to store algorithms and data, and the like.

The imaging system also has a source of power to drive operation of each of the devices thereof (e.g., each light source, the imaging detector, the processor, drive mechanisms, etc.). The power may, for example, be line power, battery power, or a combination thereof.

FIGS. 10 and 11 show an exemplary, more detailed configuration of only an illumination subsystem 142 of trans-illumination imaging system 110 of FIG. 6. The illumination subsystem has a pair of light sources 74a, 74b to irradiate a sample via different, partially overlapping optical paths for respective lower numerical aperture irradiation (FIG. 10) (for lower magnification imaging with an objective having a lower numerical aperture) and higher numerical aperture irradiation (FIG. 11) (for higher magnification imaging with an objective having a higher numerical aperture).

Energization of light source 74a produces at least partially coherent light that passes through a transmissive diffuser 84a-1, to reduce but not completely eliminate the coherence. The light then passes through a lens 180, and is reflected by a mirror 182 to a beamsplitter 184. Part of the light passes through the beamsplitter and a pair of lenses 186, 188 before reaching the sample.

Energization of light source 74b produces at least partially coherent light that passes through a pair of transmissive diffusers 84-2 and 84a-3, to reduce but not completely eliminate the coherence. The pair of diffusers may reduce the coherence more than the single diffuser utilized in the optical path of FIG. 10. The light then follows an optical path through a pair of lenses 190, 192, is partially reflected by beamsplitter 184, and passes through lenses 186, 188 before reaching the sample.

IV. Methods of Imaging with Automated Focusing using Transformed Images

This section describes an exemplary method 200 of imaging with automated focusing based on interference fringes analyzed in a frequency domain; see FIG. 12. The steps presented in FIG. 12 and/or described elsewhere herein may be performed in any suitable order and combination, using any of the system components and features described herein.

A sample may be irradiated, indicated at 202. The sample may be irradiated with light that is at least partially coherent, spatially and temporally, as described above in Sections I and II.

At least one image of the sample may be collected, indicated at 204. The image may be collected with the sample defocused sufficiently such that interference fringes are present in the image. A suitable focal position or series of focal positions for step 204 may be selected based on a focal position determined by imaging a different sample (or a different field of view for the same sample) or by detecting a reference mark on a sample holder, among others.

Each image may be transformed from a spatial domain to a frequency domain, indicated at 206. The transformation results in a transformed image and may be performed by a Fourier transform algorithm.

One or more values may be obtained from each transformed image, indicated at 208. The one or more values may be obtained from the entire transformed image or only a portion thereof (e.g., a portion extending radially from the center of the image). In some embodiments, one of the values may correspond to a rate of change in pixel intensity as the transformed image extends from a center to a periphery of the image. In some embodiments, one of the values may correspond to the difference in intensity between a first local intensity maximum spaced radially outward from the center of the transformed image, and a first local intensity minimum located intermediate the center and the first local intensity maximum. In any event, the one or more values may correlate the focal position of the image with a particular location on a contrast curve (e.g., see FIG. 8 for an exemplary contrast curve).

Each value may be tested, indicated at 210, to determine whether the value meets at least one condition, indicated at 212. For example, the value may be compared with a threshold or with at least one value determined from at least one other image. If the value(s) does not meets the condition(s), the focus of the system may be adjusted, indicated at 214, optionally based on the value(s). The method then may loop back to step 204 for collection of another image at the adjusted focus. Alternatively, if the value(s) meets the condition(s), the image may be selected for further processing, indicated at 216, such as to determine an aspect of a sample from the image (e.g., as described above for FIG. 7).

In other embodiments, the one or more values may be processed with an algorithm that determines how the focal position for the image differs from a target focal position for trans-illumination imaging, based on the one or more values. For example, if the target focal position corresponds to local contrast maximum 130a (see FIG. 8), the difference between the image focal position and the target focal position can be calculated based on the one or more values, after system calibration. The system then may automatically adjust the focus to the target focal position by moving the stage and objective relative to one another. Further aspects of method 200 are described below in Example 2 of Section V.

V. Examples

The following examples describe selected aspects and embodiments of the present disclosure related to trans-illumination imaging systems and methods utilizing interference fringes to enhance contrast or find focus. Any suitable aspects of these systems and methods may be combined with one another and with the systems and methods described elsewhere herein (e.g., in Sections I-IV). These examples are included for illustration and are not intended to limit or define the entire scope of the present disclosure.

EXAMPLE 1

Exemplary Images of Biological Cells

This example describes exemplary images collected with the trans-illumination imaging systems of Section III; see FIGS. 13-20 (also see FIGS. 9-11).

Figure 14:
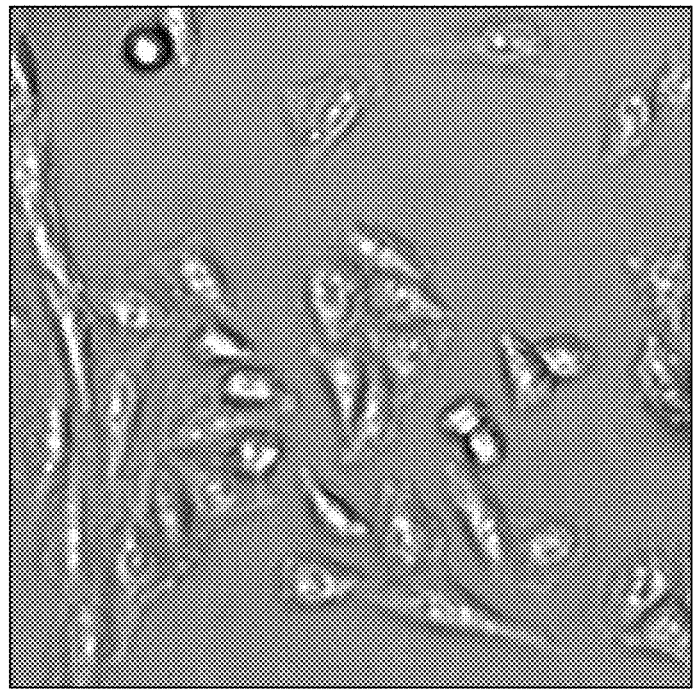
FIGS. 13 and 14 are images of the same field of biological cells detected with a working model of the imaging system of FIG. 9, with the biological cells irradiated only with incoherent light (FIG. 13) or a blend of incoherent light and partially coherent light (FIG. 14).
Figure 13:
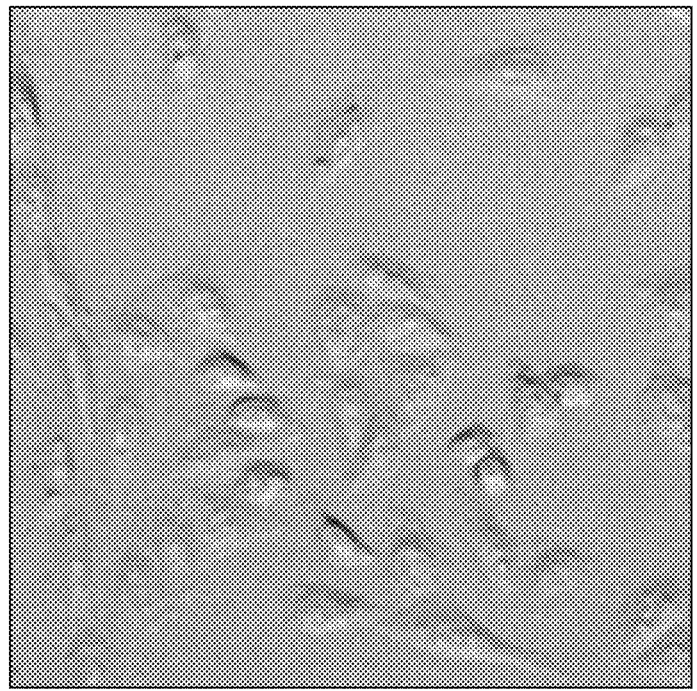

FIGS. 13 and 14 show images of the same field of biological cells detected with a working model of imaging system 80 of FIG. 9. The image in FIG. 13 was detected with mirror 162 removed (see FIG. 9), such that the cells were irradiated only with incoherent light. In the image, the cells are washed out relative to background. The edges of the cells, wherein the cells are in contact with one another, are difficult to distinguish due to poor contrast. The image in FIG. 14 was detected with mirror 162 located operatively (see FIG. 9), such that the cells were irradiated with a blend of incoherent light and partially coherent light. In the image, the contrast of the cells with background is much higher than in FIG. 13, and the boundary of each cell is more clearly delineated.

Figure 15:
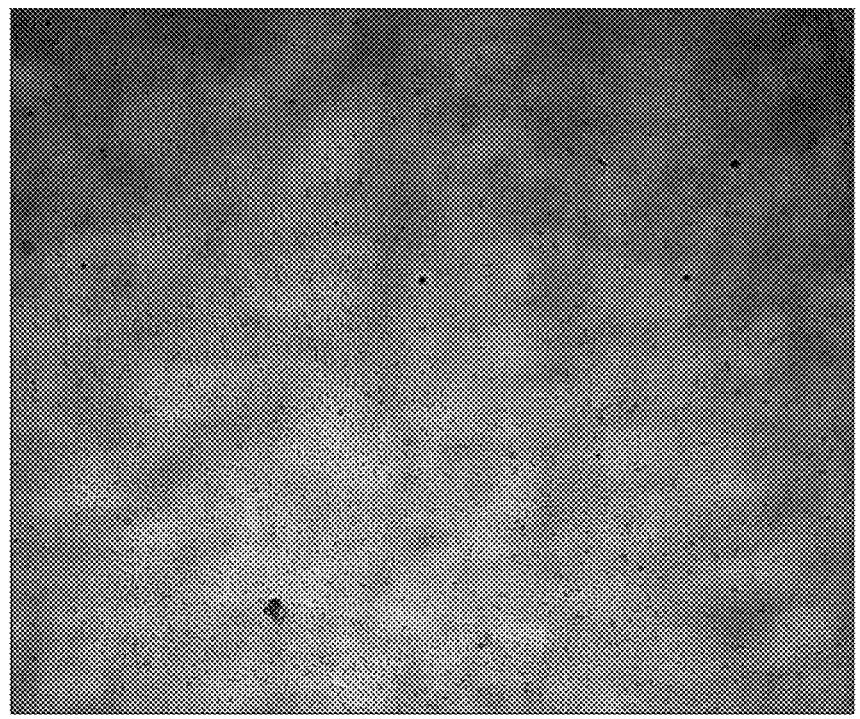
FIGS. 15 and 16 are respective lower magnification and higher magnification images of a monolayer of biological cells detected with a working model of the imaging system of FIG. 6, with the imaging system equipped with the illumination subsystem of FIG. 10, and with the diffuser removed such that interference fringes are not attenuated, in accordance with aspects of the present disclosure.
Figure 16:
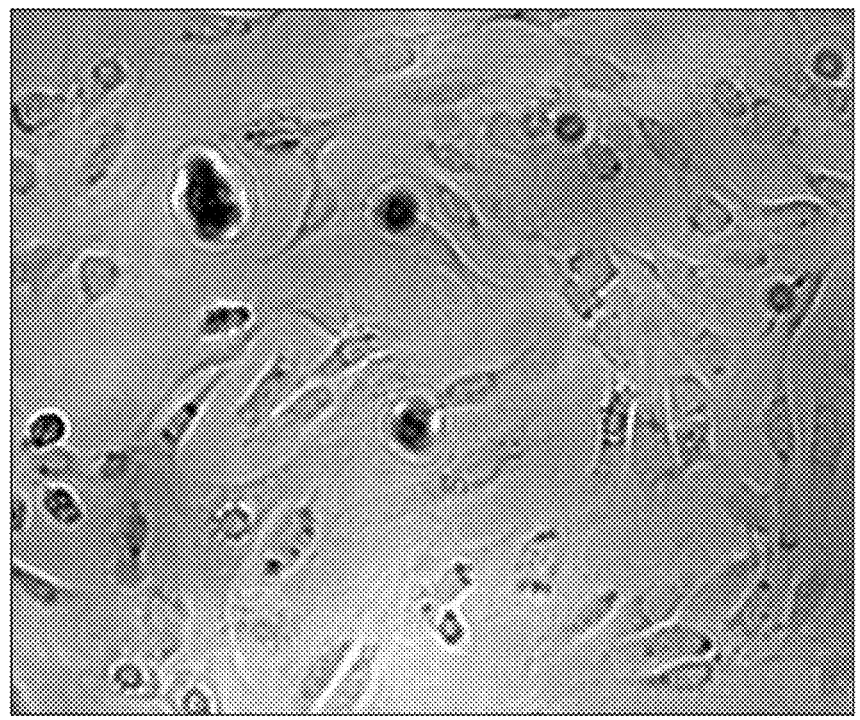

FIGS. 15 and 16 show images of CHO cells detected with a working model of imaging system 110 (see FIG. 10), but with the diffuser removed such that the interference fringes are not attenuated. The image of FIG. 15 represents lower magnification and exhibits non-uniformity due to diffraction effects of the trans-illumination light and plate sealing material casting shadows on the sample plane. There is a loss of spatial resolution at the top of the image due to the numerical-aperture restriction of the objective and refraction of trans-illumination light at a position above the sample plane. The image of FIG. 16 represents higher magnification. Rings around objects in the image are readily apparent. In particular, out-of-focus objects offset from the sample plane are visible with a large number of diffraction fringes.

Figure 17:
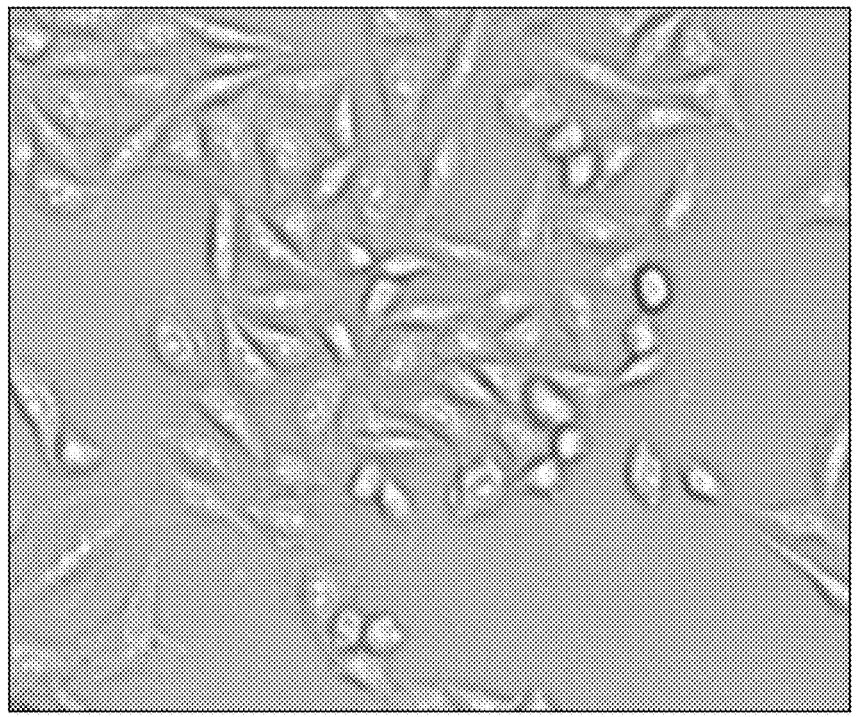
FIGS. 17 and 18 are images of a monolayer of biological cells detected with the same working model, irradiation optical path, and magnification as FIG. 16, except that the diffuser of the illumination subsystem remains operatively located in the optical path.
Figure 18:
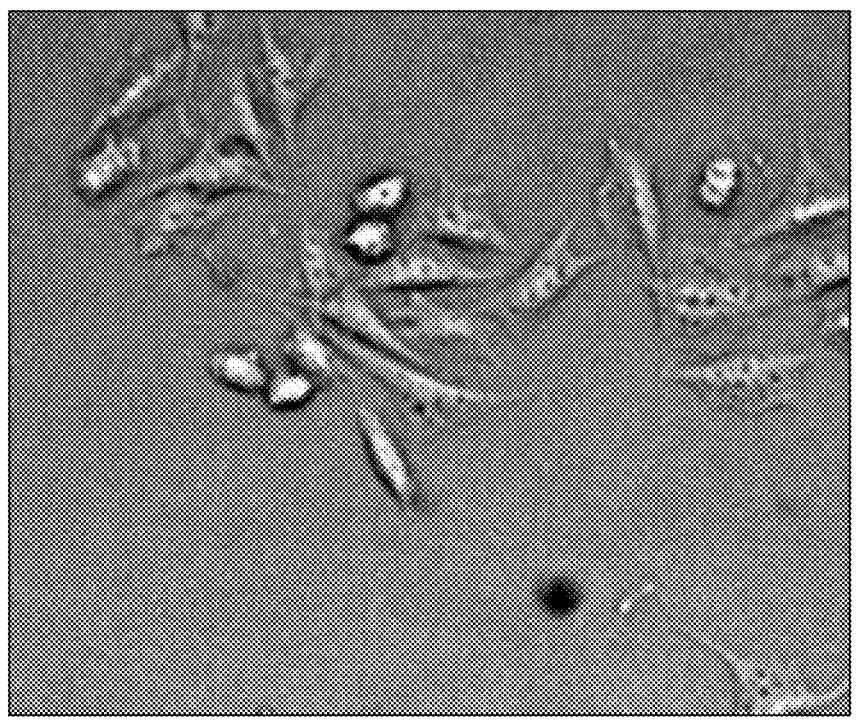

FIGS. 17 and 18 show images of CHO cells detected with a working model of imaging system 110, as in FIG. 16, but with the diffuser operatively located such that the interference fringes are attenuated but not eliminated completely. The image quality is substantially better than without fringe attenuation (compare with FIG. 16).

Figure 19:
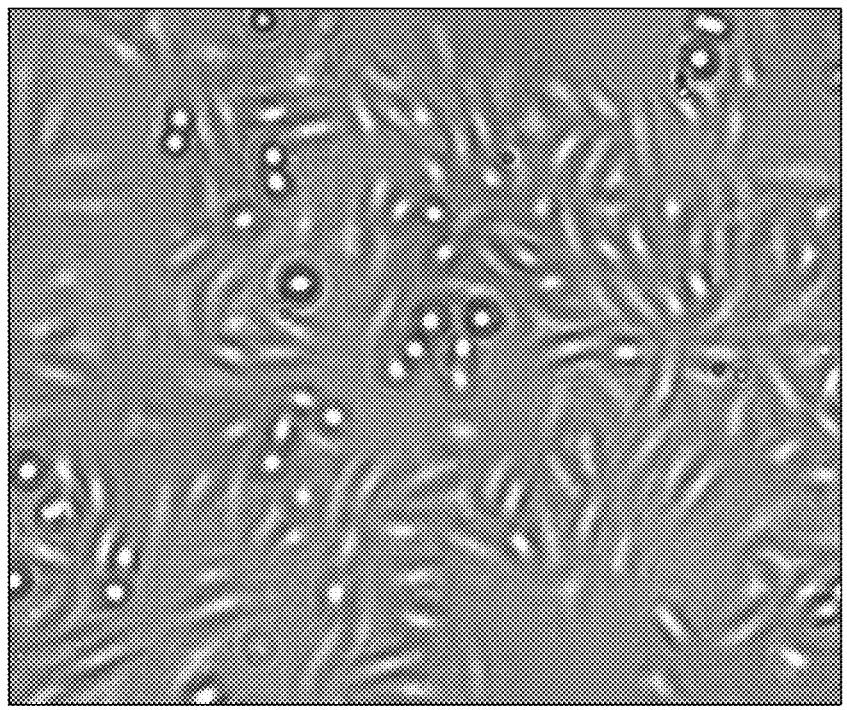
FIG. 19 is another image of biological cells detected as in FIGS. 17 and 18, except at lower magnification.

FIG. 19 is another image of CHO cells detected with the working model of imaging system 110, as in FIGS. 17 and 18, except at lower magnification. The defocused image produced with low numerical-aperture irradiation has an increased depth of field. The bright spot visible within cells is due to preferential diffraction, refraction, and scatter around the nucleus of the cells.

Figure 20:
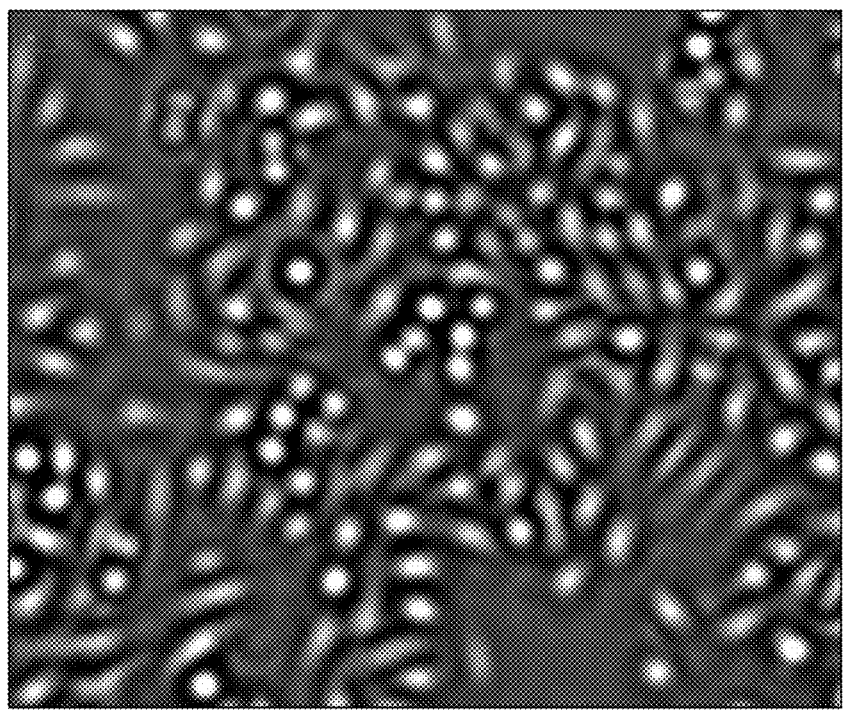
FIG. 20 is a processed form of the image of FIG. 19 in which higher order (high frequency) interference fringes have been removed selectively.

FIG. 20 shows a processed form of the image of FIG. 19. A rolling ball algorithm of 10 pixel radius was applied, followed by a fast Fourier transform bandpass filter that applies 4-20 pixels. This processing selectively removes high frequency interference fringes from the image and thus reduces the resolution of the image. Standard thresholding then was used since the fast Fourier transform will normalize the objects by spatial frequency. Cells were counted using ImageJ software to identify particles having the approximate size of a defocused nucleus.

EXAMPLE 2

Calibration of a Trans-illumination Imaging System with Automated Focus

Figure 21:
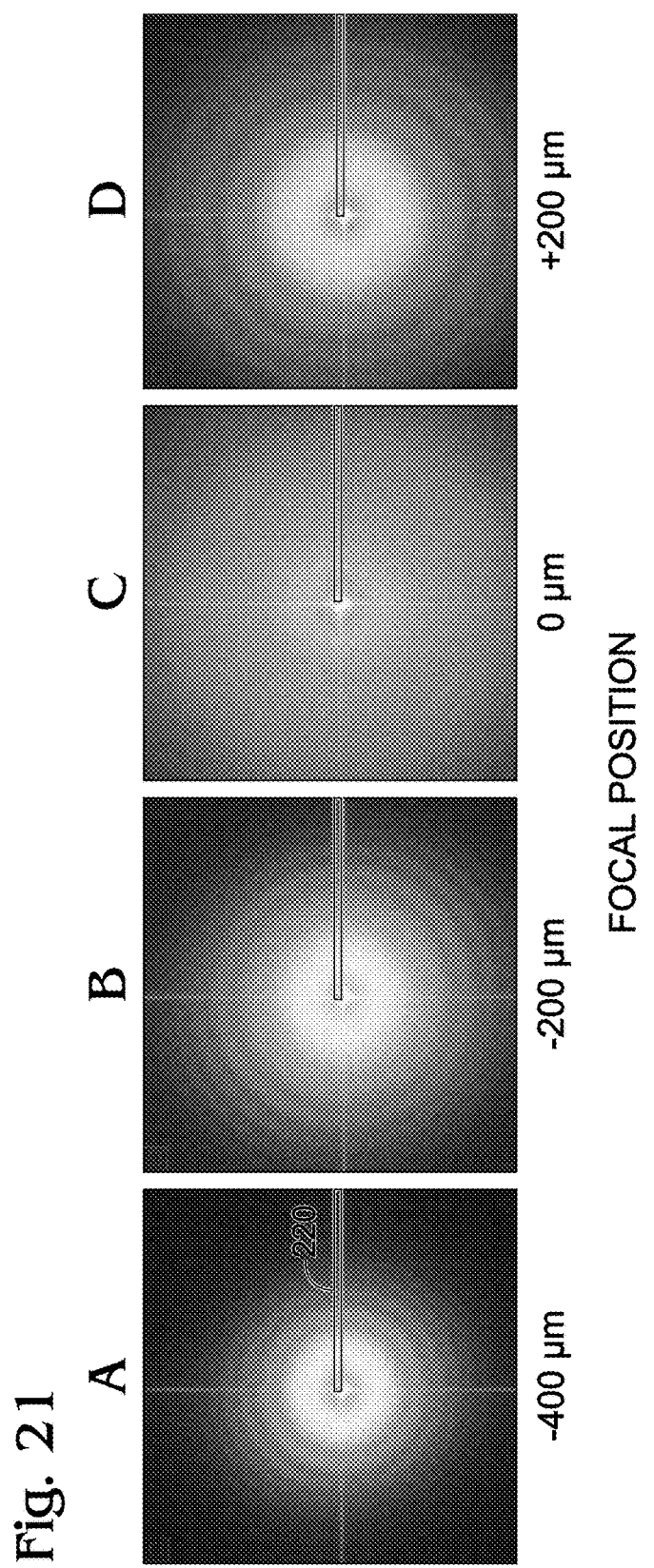
FIG. 21 is a series of images of the same field of biological cells detected at different focal positions, after each image has been transformed to a frequency domain using a Fast Fourier Transform (FFT) algorithm, in accordance with aspects of the present disclosure.
Figure 22:
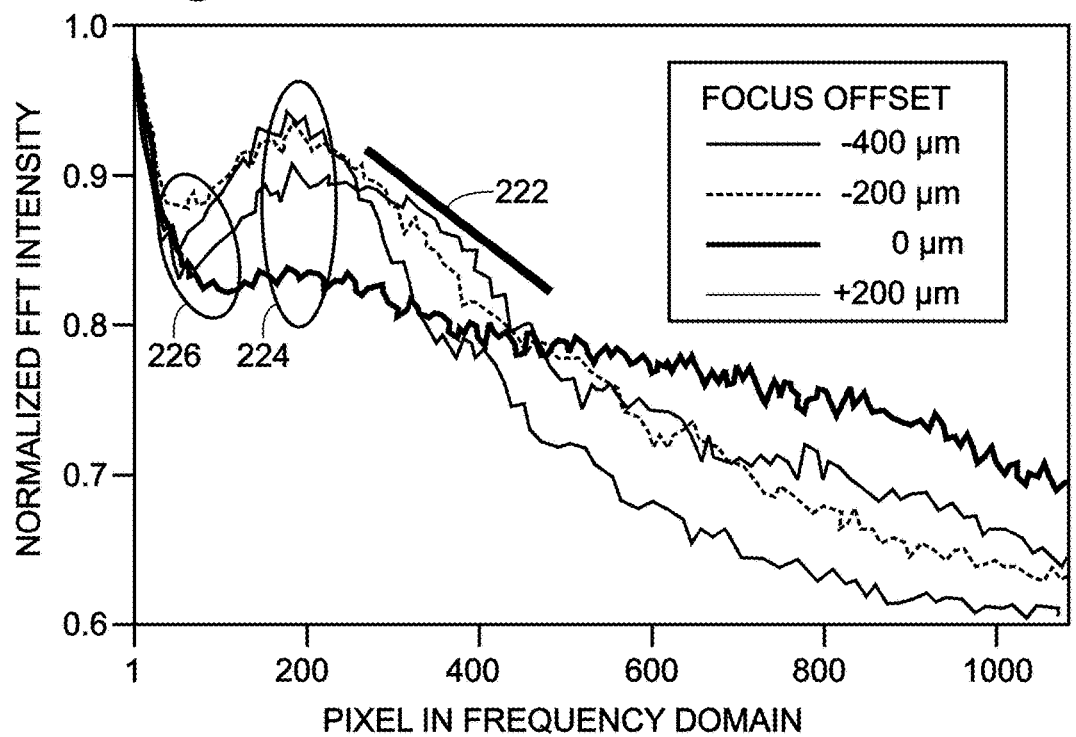
FIG. 22 is a graph generated by plotting pixel data from a corresponding region of each image of FIG. 21.
Figure 23:
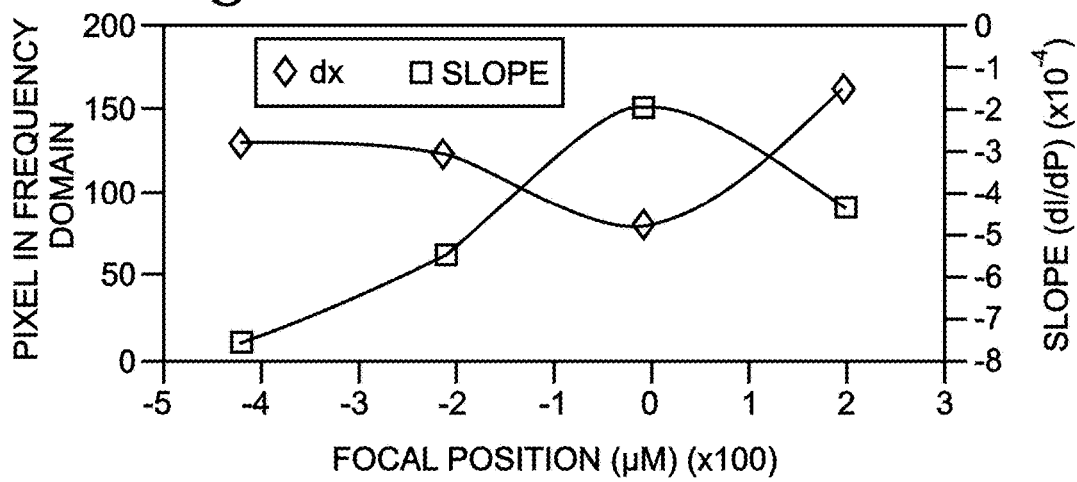
FIG. 23 is a graph of two different parameters defined by the graph of FIG. 22 and plotted as a function of focal position.

This example describes exemplary calibration data for a trans-illumination imaging system having an automated focusing mechanism based on transformation of images to a frequency domain; see FIGS. 21-23.

FIG. 21 shows a series of frequency images (diffraction patterns) of the same field of biological cells detected at different focal positions and with the cells irradiated with at least partially coherent light, such that interference fringes are formed. Spatial images were detected with an imaging detector and then transformed to frequency images in a frequency domain using a fast Fourier transform (FFT) algorithm. The focal position at which each image was detected is listed with respect to a local contrast minimum (0 μm) for trans-illumination imaging. Accordingly, images A and B were collected with a negative focal offset from the local contrast minimum, image C at the local contrast minimum, and image D with a positive focal offset from the local contrast minimum. Interference fringes of each order in the spatial images create a central spot (zero order) or a corresponding ring (first and higher orders) in the diffraction patterns.

FIG. 22 shows a graph generated by plotting the normalized intensity, as a function of pixel distance from the center of each image, for a corresponding region of each image of FIG. 21. The region is bounded by a radially-oriented rectangle 220 extending from the center of each image.

FIG. 23 shows a graph of the values of two different parameters defined by the graph of FIG. 22 and plotted as a function of focal position. One of the parameters is slope, indicated generally by a line 222 in FIG. 22. The other parameter is the difference in pixel position ("dx") between a pair of inflection points, namely, a local maximum 224 and a local minimum 226. In FIG. 23, the slope is closest to zero for a focal position (0 microns) at which the detectability of interference fringes is at a local minimum, and becomes more negative in both focal directions from that focal position. Also, the difference in pixel position, dx, exhibits a local minimum at that focal position and increases in both focal directions from that focal position. Accordingly, an algorithm may operate to progressively adjust the focus (see FIG. 12), to minimize the spacing between inflection points and/or to minimize the slope.

EXAMPLE 3

Selected Embodiments

This example describes selected embodiments of the present disclosure as a series of indexed paragraphs.

Paragraph A1. A method of trans-illumination imaging, the method comprising: reducing a coherence of light upstream of a sample by scattering and mixing at least a portion of the light; irradiating the sample with the light of reduced coherence; and detecting an image of the sample created with at least a portion of the light of reduced coherence that has passed through a plane defined by the sample; wherein the step of detecting is performed with the sample sufficiently defocused to form interference fringes in the image, and wherein the step of reducing diminishes an intensity of the interference fringes.

Paragraph A2. The method of paragraph A1, further comprising a step of generating at least a portion of the light with a light source, wherein the step of reducing is performed at least in part using a diffuser disposed in an optical path between the light source and the sample.

Paragraph A3. The method of paragraph A2, wherein the step of reducing includes a step of passing light through the diffuser and/or a step of reflecting light with the diffuser.

Paragraph A4. The method of paragraph A2 or A3, further comprising steps of forming a beam of light; splitting the beam of light into a pair of beams upstream of the diffuser, wherein only one beam of the pair of beams is incident on the diffuser; and combining the pair of beams with one another downstream of the diffuser and upstream of the sample.

Paragraph A5. The method of any of paragraphs A1 to A4, wherein the step of reducing includes a step of combining a pair of light beams having a different coherence from one another.

Paragraph A6. The method of paragraph A5, wherein the pair of light beams are generated by at least two light sources.

Paragraph A7. The method of paragraph A5, wherein the pair of light beams are generated using light from the same light source.

Paragraph A8. The method of any of paragraphs A1 to A7, further comprising steps of collecting a plurality of images of the sample using an imaging detector, and with the sample and an objective disposed at a corresponding plurality of different focal positions relative to one another; calculating a contrast of each of the plurality of images; determining a focal position at which the contrast has a local maximum or a local minimum; and adjusting a focus of the sample on the image detector based on the focal position determined, such that the sample is sufficiently defocused to form interference fringes in the image; wherein the step of detecting is performed with the adjusted focus.

Paragraph A9. The method of paragraph A8, wherein the step of adjusting a focus includes a step of adjusting the focus to the local contrast maximum.

Paragraph A10. The method of paragraph A8 or A9, wherein the step of collecting a plurality of images includes a step of moving the objective while the sample remains stationary, to produce each of the corresponding plurality of different focal positions.

Paragraph A11. The method of any of paragraphs A1 to A10, wherein the light is generated with at least one solid-state light source.

Paragraph A12. The method of paragraph A11, wherein the light is generated with only one solid-state light source.

Paragraph A13. The method of any of paragraphs A1 to A12, further comprising a step of enumerating an aspect of the sample based on the image detected.

Paragraph A14. The method of paragraph A13, further comprising a step of processing the image such that a resolution thereof is reduced, wherein the step of enumerating is based on the processed image.

Paragraph A15. The method of paragraph A14, wherein the interference fringes include first order fringes and higher order fringes, and wherein the step of processing the image selectively eliminates the higher order fringes relative to the first order fringes.

Paragraph A16. The method of paragraph A14 or A15, wherein the step of processing the image includes a step of transforming the image to a frequency domain, a step of removing higher frequency information from the transformed image, and a step of reverse transforming the transformed image from the frequency domain to a spatial domain.

Paragraph A17. The method of any of paragraphs A14 to A16, further comprising a step of segmenting the processed image, wherein the step of enumerating is based on the segmented image.

Paragraph A18. The method of any of paragraphs A1 to A17, wherein the sample includes biological cells.

Paragraph A19. The method of any of paragraphs A1 to A7 or A11 to A18, further comprising steps of collecting a plurality of images of the sample using an imaging detector, and with the sample and an objective disposed at a corresponding plurality of different focal positions relative to one another, wherein the step of collecting includes the step of detecting; calculating a contrast of each of the plurality of images; selecting one of the images based on the contrast of the one image; and enumerating an aspect of the sample based on the image selected.

Paragraph B1. A system for trans-illumination imaging, comprising: a light source to generate light that is at least partially coherent; a stage to support a sample; a diffuser operatively disposed in an optical path between the light source and the stage, the diffuser being configured to reduce a coherence of light incident on the sample by scattering and mixing light; an objective to collect light that has passed through a plane defined by the sample; a focusing mechanism to adjust a distance between the stage and the objective; an imaging detector configured to detect light received from the objective; and a processor configured to cause the focusing mechanism to defocus the sample sufficiently such that interference fringes are formed in an image collected by the imaging detector; wherein the diffuser is configured to diminish but not completely eliminate formation of the interference fringes.

Paragraph B2. The system of paragraph B1, wherein the processor is configured to reduce a resolution of the image, segment the reduced-resolution image, and enumerate an aspect of the sample using the segmented image.

Paragraph B3. The system of paragraph B1 or B2, wherein the processor is configured to (a) cause the imaging detector to collect a plurality of images, with the sample and an objective disposed at a corresponding plurality of different focal positions relative to one another; (b) calculate a contrast of each of the plurality of images; (c) determine a focal position at which the contrast has a local maximum or a local minimum; and (d) adjust a focus of the sample on the image detector based on the focal position determined, such that the sample is sufficiently defocused to form interference fringes in the image.

Paragraph C1. A method of focusing an imaging system, the method comprising: detecting one or more images of a sample, wherein the image contains interference fringes and is detected with an imaging detector; transforming each of the one or more images to a frequency domain; determining one or more values from each transformed image; adjusting a focus of the sample on the imaging detector based on the one or more values from each transformed image; and detecting an image of the sample at the adjusted focus.

Paragraph C2. The method of paragraph C1, wherein the step of transforming is performing with a Fourier transform algorithm.

Paragraph C3. The method of paragraph C1 or C2, wherein the step of determining one or more values includes a step of determining a slope and/or at least one inflection point defined by at least a portion of each transformed image.

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. The subject matter of the inventions includes all novel and nonobvious combinations and subcombinations of the various elements, features, functions, and/or properties disclosed herein. The following claims particularly point out certain combinations and subcombinations regarded as novel and nonobvious. Inventions embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the inventions of the present disclosure. Further, ordinal indicators, such as first, second, or third, for identified elements are used to distinguish between the elements, and do not indicate a particular position or order of such elements, unless otherwise specifically stated.

What is claimed is:

1. A method of trans-illumination imaging, the method comprising:
reducing a coherence of light upstream of a sample by scattering and mixing at least a portion of the light;
irradiating through the sample the light of reduced coherence; and
detecting, at a location that is on an opposite side of the sample as compared to the light, an image of the sample created with at least a portion of the light of reduced coherence that has passed through a plane defined by the sample;
wherein the step of detecting is performed with the sample sufficiently defocused to form interference fringes in the image, and
wherein the step of reducing diminishes an intensity of the interference fringes.

2. The method of claim 1, further comprising a step of generating at least a portion of the light with a light source, wherein the step of reducing is performed at least in part using a diffuser disposed in an optical path between the light source and the sample.

3. The method of claim 2, wherein the step of reducing includes a step of passing light through the diffuser and/or a step of reflecting light with the diffuser.

4. The method of claim 1, wherein the step of reducing includes a step of combining a pair of light beams having a different coherence from one another.

5. The method of claim 4, wherein the pair of light beams are generated by at least two light sources.

6. The method of claim 4, wherein the pair of light beams are generated using light from the same light source.

7. The method of claim 1, wherein the light is generated with at least one solid-state light source.

8. The method of claim 1, wherein the sample includes biological cells.

9. A method of trans-illumination imaging, the method comprising:
reducing a coherence of light upstream of a sample by scattering and mixing at least a portion of the light;
irradiating the sample with the light of reduced coherence; and
detecting an image of the sample created with at least a portion of the light of reduced coherence that has passed through a plane defined by the sample, wherein the step of detecting is performed with the sample sufficiently defocused to form interference fringes in the image, and wherein the step of reducing diminishes an intensity of the interference fringes;
splitting the light into a pair of beams upstream of the diffuser, wherein only one beam of the pair of beams is incident on the diffuser; and
combining the pair of beams with one another downstream of the diffuser and upstream of the sample.

10. A method of trans-illumination imaging, the method comprising:
reducing a coherence of light upstream of a sample by scattering and mixing at least a portion of the light;
irradiating the sample with the light of reduced coherence; and
detecting an image of the sample created with at least a portion of the light of reduced coherence that has passed through a plane defined by the sample, wherein the step of detecting is performed with the sample sufficiently defocused to form interference fringes in the image, and wherein the step of reducing diminishes an intensity of the interference fringes;
collecting a plurality of images of the sample using an imaging detector, and with the sample and an objective disposed at a corresponding plurality of different focal positions relative to one another;
calculating a contrast of each of the plurality of images;
determining a focal position at which the contrast has a local maximum or a local minimum; and
adjusting a focus of the sample on the image detector based on the focal position determined, such that the sample is sufficiently defocused to form interference fringes in the image;
wherein the step of detecting is performed with the adjusted focus.

11. The method of claim 10, wherein the step of adjusting a focus includes a step of adjusting the focus to the local contrast maximum.

12. The method of claim 10, wherein the step of collecting a plurality of images includes a step of moving the objective while the sample remains stationary, to produce each of the corresponding plurality of different focal positions.

13. A method of trans-illumination imaging, the method comprising:

reducing a coherence of light upstream of a sample by scattering and mixing at least a portion of the light;
irradiating the sample with the light of reduced coherence;
detecting an image of the sample created with at least a portion of the light of reduced coherence that has passed through a plane defined by the sample, wherein the step of detecting is performed with the sample sufficiently defocused to form interference fringes in the image, and wherein the step of reducing diminishes an intensity of the interference fringes; and
enumerating an aspect of the sample based on the image detected.

14. The method of claim 13, further comprising a step of processing the image such that a resolution thereof is reduced, wherein the step of enumerating is based on the processed image.

15. The method of claim 14, wherein the interference fringes include first order fringes and higher order fringes, and wherein the step of processing the image selectively eliminates the higher order fringes relative to the first order fringes.

16. The method of claim 14, wherein the step of processing the image includes a step of transforming the image to a frequency domain, a step of removing higher frequency information from the transformed image, and a step of reverse transforming the transformed image from the frequency domain to a spatial domain.

17. The method of claim 14, further comprising a step of segmenting the processed image, wherein the step of enumerating is based on the segmented image.

18. A method of trans-illumination imaging, the method comprising:
reducing a coherence of light upstream of a sample by scattering and mixing at least a portion of the light;
irradiating the sample with the light of reduced coherence;
detecting an image of the sample created with at least a portion of the light of reduced coherence that has passed through a plane defined by the sample, wherein the step of detecting is performed with the sample sufficiently defocused to form interference fringes in the image, and wherein the step of reducing diminishes an intensity of the interference fringes;
collecting a plurality of images of the sample using an imaging detector, and with the sample and an objective disposed at a corresponding plurality of different focal positions relative to one another, wherein the step of collecting includes the step of detecting an image;
calculating a contrast of each of the plurality of images;
selecting one of the images based on the contrast of the one image; and
enumerating an aspect of the sample based on the image selected.

19. A system for trans-illumination imaging, comprising:
a light source to generate light that is at least partially coherent;
a stage to support a sample;
a diffuser operatively disposed in an optical path between the light source and the stage, the diffuser being configured to reduce a coherence of light incident on the sample by scattering and mixing light generated by the light source;
an objective to collect light that has passed through a plane defined by the sample;
a focusing mechanism to adjust a distance between the stage and the objective;
an imaging detector at a location that is on an opposite side of the sample as compared to the light source configured to detect light received from the objective; and
a processor configured to cause the focusing mechanism to defocus the sample sufficiently such that interference fringes are formed in an image collected by the imaging detector;
wherein the diffuser is configured to diminish but not completely eliminate formation of the interference fringes.

20. A system for trans-illumination imaging, comprising:
a light source to generate light that is at least partially coherent;
a stage to support a sample;
a diffuser operatively disposed in an optical path between the light source and the stage, the diffuser being configured to reduce a coherence of light incident on the sample by scattering and mixing light generated by the light source;
an objective to collect light that has passed through a plane defined by the sample;
a focusing mechanism to adjust a distance between the stage and the objective;
an imaging detector configured to detect light received from the objective; and
a processor configured to cause the focusing mechanism to defocus the sample sufficiently such that interference fringes are formed in an image collected by the imaging detector;
wherein the diffuser is configured to diminish but not completely eliminate formation of the interference fringes, wherein the processor is configured to reduce a resolution of the image, segment the reduced-resolution image, and enumerate an aspect of the sample using the segmented image.

21. A system for trans-illumination imaging, comprising:
a light source to generate light that is at least partially coherent;
a stage to support a sample;
a diffuser operatively disposed in an optical path between the light source and the stage, the diffuser being configured to reduce a coherence of light incident on the sample by scattering and mixing light generated by the light source;
an objective to collect light that has passed through a plane defined by the sample;
a focusing mechanism to adjust a distance between the stage and the objective;
an imaging detector configured to detect light received from the objective; and
a processor configured to cause the focusing mechanism to defocus the sample sufficiently such that interference fringes are formed in an image collected by the imaging detector;
wherein the diffuser is configured to diminish but not completely eliminate formation of the interference fringes, wherein the processor is configured to cause the imaging detector to collect a plurality of images, with the sample and an objective disposed at a corresponding plurality of different focal positions relative to one another; calculate a contrast of each of the plurality of images; determine a focal position at which the contrast has a local maximum or a local minimum; and adjust a focus of the sample on the image detector based on the focal position determined, such that the sample is sufficiently defocused to form interference fringes in the image.

22. A method of focusing an imaging system, the method comprising:
   detecting one or more images of a sample, wherein the image contains interference fringes and is detected with an imaging detector, the imaging detector being located at an opposite side of the sample as compared to a light source that transmits light through the sample;
   transforming each of the one or more images to a frequency domain;
   determining one or more values from each transformed image;
   adjusting a focus of the sample on the imaging detector based on the one or more values from each transformed image; and
   detecting an image of the sample at the adjusted focus.

23. A method of trans-illumination imaging, the method comprising:
   illuminating light through a sample, wherein a coherence of the light is reduced by scattering at least a portion of the light using a diffuser;
   detecting, through a detector, an image of the sample created with at least a portion of the light of reduced coherence that has passed through a plane defined by the sample, the detecting performed with the sample sufficiently defocused to form interference fringes in the image.

* * * * *